United States Patent

Ward et al.

[11] Patent Number: 5,772,894
[45] Date of Patent: Jun. 30, 1998

[54] DERIVATIZED RHODAMINE DYE AND ITS COPOLYMERS

[75] Inventors: William J. Ward, Glen Ellyn; Jeffrey R. Cramm, Winfield; Peter E. Reed, Plainfield; Brian S. Johnson, Naperville, all of Ill.

[73] Assignee: Nalco Chemical Company, Naperville, Ill.

[21] Appl. No.: 682,497

[22] Filed: Jul. 17, 1996

[51] Int. Cl.$^6$ .............................. B01D 21/01; C02F 1/56; C08F 224/00; C08F 226/02

[52] U.S. Cl. .......................... 210/734; 210/745; 526/268; 526/310

[58] Field of Search ............................ 252/175; 526/268, 526/310; 210/734, 745

[56] References Cited

U.S. PATENT DOCUMENTS 4,654,378  3/1987  Hunter et al. ................ 522/3
4,826,606  5/1989  Becker et al. ............... 252/175

FOREIGN PATENT DOCUMENTS 1141147  1/1969  United Kingdom.

Primary Examiner—Joseph L. Schofer
Assistant Examiner—Wu C. Cheng
Attorney, Agent, or Firm—Robert A. Miller; Kelly L. Cummings

[57] ABSTRACT

Disclosed are the Rhodamine B esters of hydroxy $C_2$–$C_6$ lower alkyl acrylates. Specifically, the hydroxy lower alkyl radical is a linear hydroxy lower alkyl radical having the hydroxy group attached to the terminal carbon atom. Also shown are copolymers of diallyldimetyl ammonium chloride which contains from 0.01–2 mole percent of these Rhodamine B esters and their use in treating industrial waters.

5 Claims, 3 Drawing Sheets

TAGGED DADMAC POLYMER

+ DADMAC Monomer $H_2O$ / NaCl
V - 50 n = 99.87%
x = 0.13%

TAGGED DADMAC POLYMER

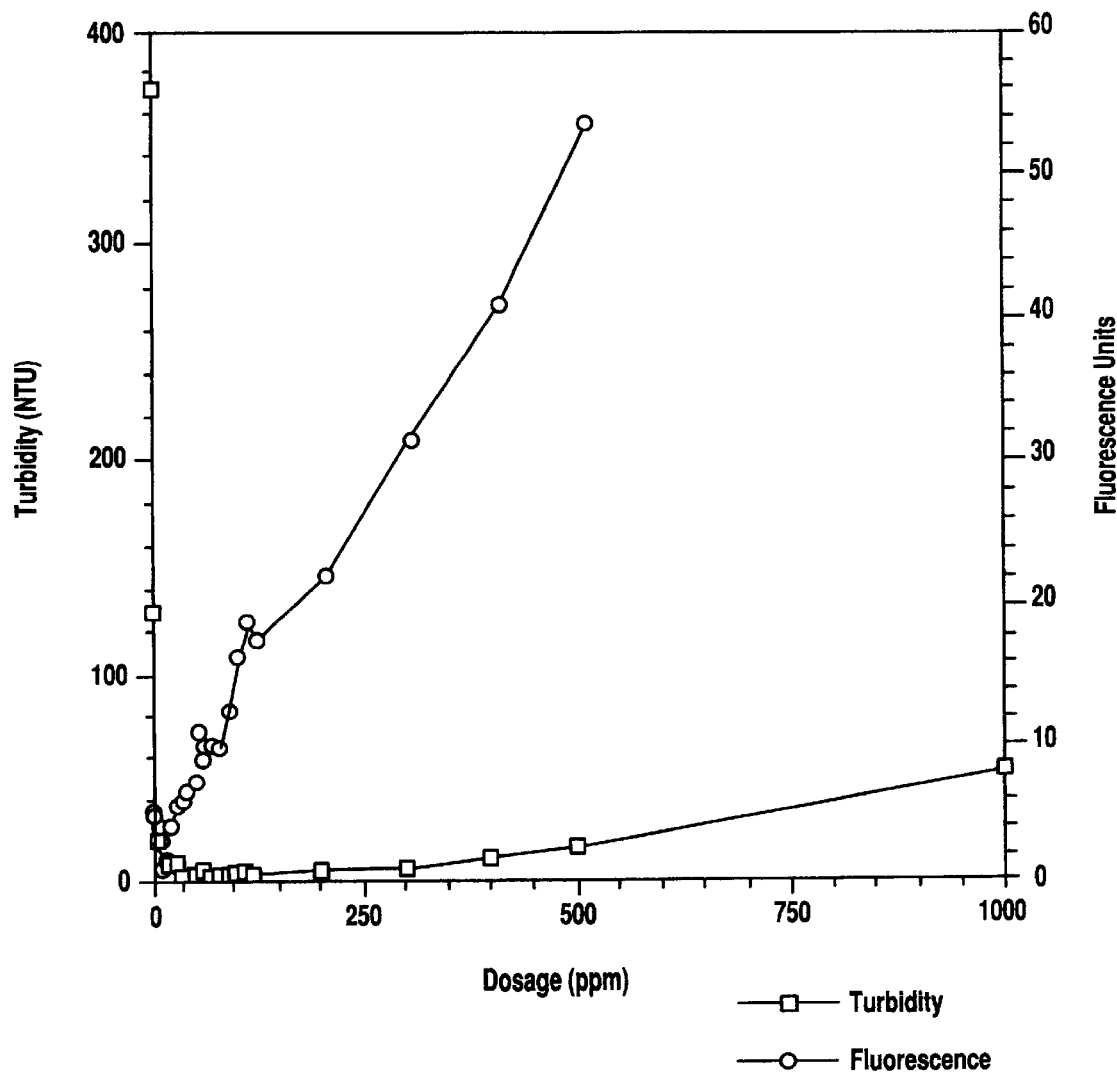

DERIVATIZED RHODAMINE DYE AND ITS COPOLYMERS

BACKGROUND OF THE INVENTION

1. Field of the Invention

This invention relates to Rhodamine B which is modified to contain a vinyl group and its incorporation into radically polymerized compounds such as diallyldimenthyammonium chloride (DADMAC) polymers.

2. Description of the Prior Art

Technological advances have made it economically practical to monitor the residual level of polymeric coagulants in wastewater effluents. Knowledge of the fate of coagulants has several advantages:

1) monitor treated water residuals,
2) control coagulant addition, and
3) elucidate coagulation mechanisms. This allows better control of dosage levels of these coagulants and to minimize these polymers contributing to pollution. A common approach to monitoring the level of water soluble polymer coagulants has been, to blend fluorescent dyes in small amounts and to use fluorescence of the mixture to determine the concentration of the polymer in aqueous systems.

This approach has met with some success but it has limitations. In using simple blends of fluorescent dyes with polymeric coagulants there is the problem that the dye associates itself with other components, such as particulates. Subsequent fluorescent detection of the dye does not provide the location of the polymeric coagulant. A more recent approach has been to covalantly modify the dye so that it might be incorporated by means of chemical reaction into the polymer. Since the dye and the coagulant are physically attached, detection of the dye also detects the coagulant polymer. While this approach has met with some success, it is economically important that the dye be readily detected at low concentrations. Particularly there is not presently available a DADMAC polymer which contains chemically combined therewith a fluorescent dye suitable for monitoring these polymers when they are used in aqueous systems.

If it were possible to modify polymers with a highly fluorescent dye, so that the dye became a part of the molecule and that the so modified polymer could be readily detected in the part per billion (ppb) range using existing fluorescent detection techniques, an advance in the art would be afforded. Also of importance would be, to use in the modification of the polymers, a dye which was easily synthesized from available chemicals, was stable and retained a high degree of fluorescence. Finally, the modified polymer should have activity as a water treating chemical corresponding to the activity of a similar unmodified polymer.

SUMMARY OF THE INVENTION

The invention comprises the Rhodamine B ester of a hydroxy $C_2$–$C_6$ lower alkyl acrylate. The hydroxy lower alkyl radical preferably, is a linear hydroxy lower alkyl radical having the hydroxy group attached to the terminal carbon atom. In another preferred embodiment, the Rhodamine B ester is a hydroxy lower alkyl radical is a $C_2$–$C_4$ radical, an example of which is the Rhodamine B ester of 4-hydroxybutyl acrylate. The important point is that the hydrocarbon linkage contain a hydroxy group and an acrylate group. The hydroxy group for modification of Rhodamine B, and the acrylate group for free radical polymeric incorporation.

The invention also comprises copolymers of diallyldimetyl ammonium chloride which contains from 0.01–2 mole percent of the Rhodamine B esters of the types described above. It is noted that any free radical polymerization process could incorporate the invention as long as the dye's fluorescent properties were retained. The invention further contemplates using these polymers in water treating applications such as, but not limited to, coagulation. This allows the dosage and residual quantities of the polymers to be controlled and monitored using conventional fluorescence detecting equipment even though the polymers are present in the ppb range.

THE DRAWINGS

FIG. 3 demonstrates the ability of a DADMAC-Rhodamine B copolymer to act as a coagulant and be easily detectable at low dosages.

Figure 1:
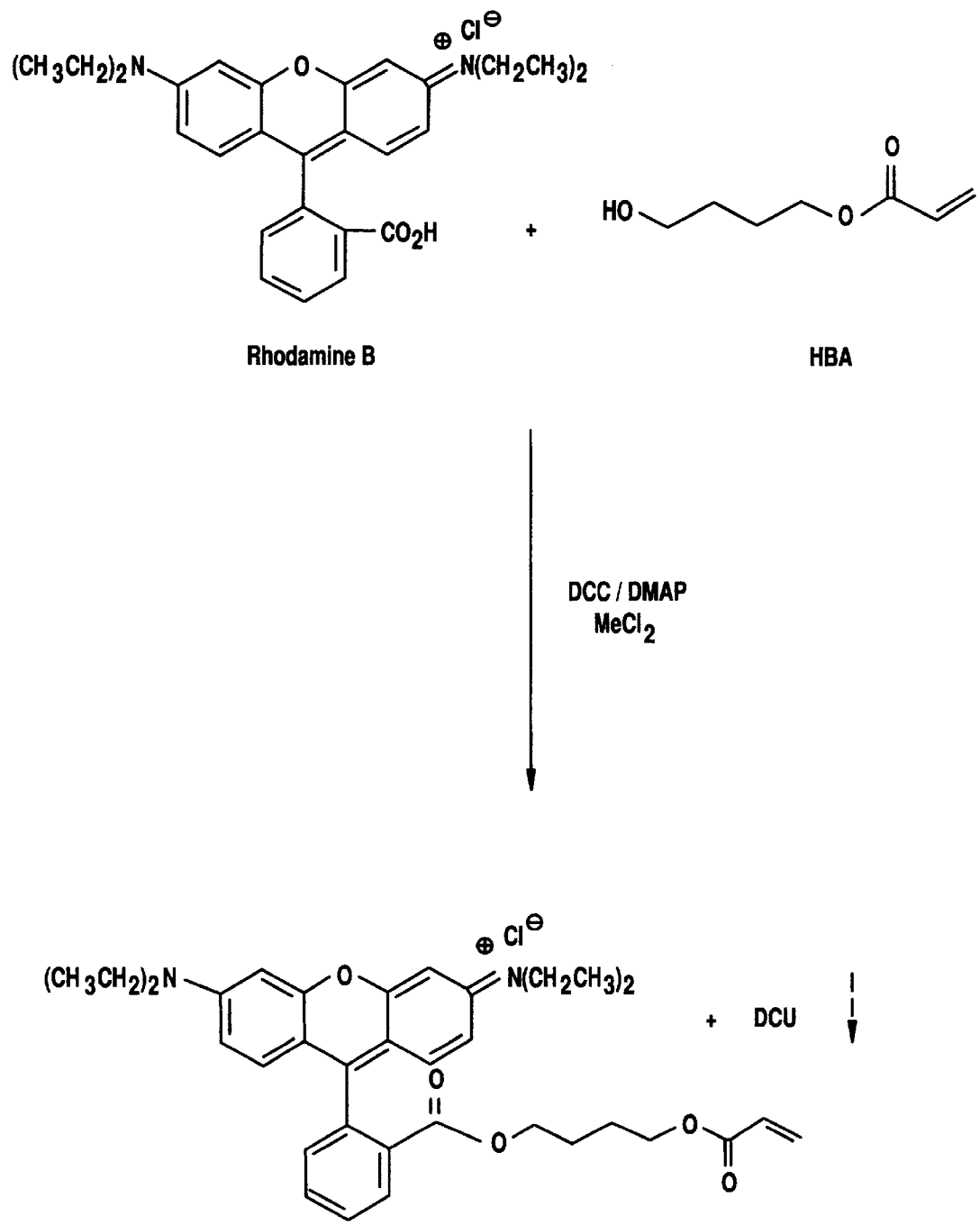
FIG. 1 shows a scheme for reacting Rhodamine B with 4-hydroxy butyl acrylate.

DESCRIPTION OF THE PREFERRED EMBODIMENTS Modified Rhodamine B and its DADMAC Copolymers Rhodamine B is a well known fluorescent dye with its structure being shown in FIG. 1. 4-hydroxy butyl acrylate is a well known acrylate ester and is commercially available. While this ester is preferred other acrylate esters that may be used in the practice of the invention are 2-hydroxy ethyl acrylate and 6-hydroxy hexyl acrylate and the like. The hydroxy acrylate esters are desirably reacted with the carboxylic acid group of the Rhodamine B at low temperatures such at about room temperature±24 degrees C using the synthetic methods generally described in the publications: Tetrahedron Letters No. 46 pp 4775-8, Pergamon Press, 1978 and Euro Polymer J. Vol. 27 No. 10 pp 1045 and 1048.The disclosures of these references are incorporated herein by reference.

The DADMAC polymers modified by the acrylate ester modified Rhodamine B may be synthesized using known free radical polymerization techniques. These copolymers may contain between 0.01 to 2 mole percent of the modified Rhodamine B monomer based on DADMAC. Of course, the invention is in and or itself, a monomer and potentially could be incorporated at higher levels. Preferably the amount of the fluorescent monomer is within the range of 0.1 to 1 mole percent. The modified or tagged DADMAC polymers have an intrinsic viscosity, as measured in 1M $NaNo_3$ at 30 degrees C., of at least 0.3. For most water treating applications such as coagulation the intrinsic viscosity should be within the range of 0.3 to 0.9. For some applications the intrinsic viscosity may be 1.6 or greater. When used to treat industrial waters the dosage of the modified polymers would usually vary from a few parts per million up to several hundred depending on the system treated and the intrinsic viscosity of the polymer used. When used as a coagulant the dosage would typically be between a few ppm up to ca. 100 ppm.

EVALUATION OF THE INVENTION Synthetic Procedure: 4-Hydroxybutylacrylate/Rhodamine B Ester The following procedure was used to prepare this material in the laboratory and is shown in FIG. 1. To a 100 mL round bottom flask, equipped with a magnetic stirring bar, was added 3.00 g (6.26 mole) of Rhodamine B (97%) and 40 mL of anhydrous methylene chloride solvent. The mixture was stirred, under nitrogen, until the Rhodamine reagent was dissolved. An amount (0.08 g, 0.65 mole) of 4-dimethylaminopyridine (DMAP) was then added to the flask, along with 1.5 mL (1.6 equivalents) of 4-hydroxybutylacrylate (HBA, 96%). The mixture was then cooled to 0 degrees C., and 6.26 mL of 1,3-dicyclohexylcarbodiimide (DCC, 1.0M solution in methylene chloride, 1 equivalent) was injected into the reaction flask with stirring. The reaction was held at 0 degrees C. for ½hour, then the reaction was allowed to slowly warm to room temperature, and then stirred under nitrogen overnight. It was noted that the reaction by-product dicyclohexylurea (DCU) began to precipitate from solution shortly (approximately 3 minutes) after the addition of the DCC.

Figure 2:
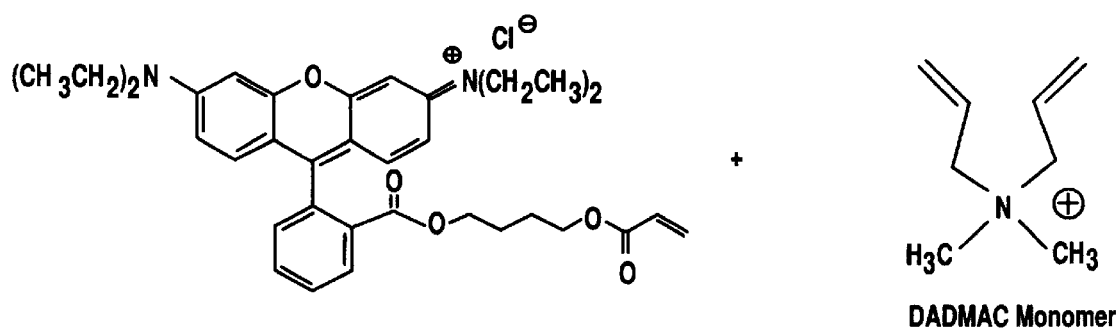
FIG. 2 illustrates the polymerization of DADMAC with the modified Rhodamine B of FIG. 1.
Figure 2:
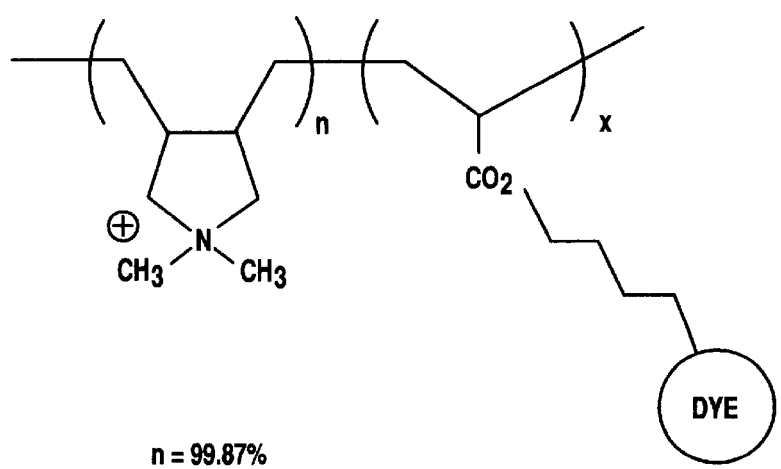

At the end of the reaction period the methylene chloride solvent was removed via rotary evaporation, and the reaction mixture re-dissolved in 50 mL of acetonitrile. The insoluble DCU was filtered off and the solvent removed and the product dried under a vacuum, leaving an amorphous solid, that is soluble in water and most polar organic solvents. The product also has the characteristic of an extremely powerful dye. Some impurities were removed by passing the material through a silica gel plug (70–270 mesh) using an acetonitrile mobile phase. In this way 1.6 g of the dye was isolated (molecular wt.=605.19 amu). Thin layer chromatography (TLC) showed the presence of three spots, two are weak and one is strong. The strong spot corresponds to the product. A weak spot below the product spot corresponds to unreacted Rhodamine B. A weak spot above the product spot is unknown, it may be due to dimerized product. All the spots seemed to be fluorescent. The TLC solvent that gave the best separation was isopropyl alcohol. NMR analysis gave rise to complex spectra that indicated that the ester product was formed. The purity was approximately 90% The major impurities were approximately 5% unreacted Rhodamine B reagent and 5% of an unknown compound. Synthetic Procedure: Tagged DADMAC Polymer The following laboratory method was used to prepare a DADMAC polymer containing the above Rhodamine acrylate dye monomer and is shown in FIG. 2. Into a 250 mL reaction kettle equipped with a stirring shaft, thermocouple, condenser, nitrogen inlet, and an addition port, was added 0.28 g (0.13 mole percent based on monomer) of the dye monomer (approximately 90% pure) and 5.16 g D.I. water. To this was added 80.64 g of a 62.0% DADMAC monomer solution. The mixture was stirred and purged with nitrogen. A quantity of 18.0 g of NaCl was added to the mixture and the reaction mixture heated to 58 degrees C in a water bath. An initiator solution was prepared by dissolving 0.5 g of V-50 initiator into 5.00 g of D.I. water. One mL of this initiator solution was then injected into the reactor, and a timer was started. After one hour another 1 mL portion of the initiator solution was added to the reactor, and again at the two hour and three hour mark. At this point the mixture was a very thick paste. After 4.5 hours the polymer began to climb up the stirring shaft. When the timer reached 5 hours, 40 mL of D.I. water was added to the mixture, then an additional 17 mL of water was added at 5.25 hours. The reaction temperature was then raised to 80 degrees C, and the remaining 1 mL of the initiator solution was injected into the reactor. The mixture was then held at 80 degrees C with stirring for one hour. The reactor was removed from the water bath and 83 g of D.I. water was added with stirring. The mixture was allowed to cool and another 83 g of water was added to the reactor to give a 15% polymer solution. The product produced was a viscous dark pink material.

The following procedures were used to characterize the polymer. The Brookfield viscosity was obtained using a #2 spindle at a speed of 12. The intrinsic viscosity (I.V.) was taken on a 1% polymer solution prepared from 6.67 g of polymer product, 50 mL of 2M NaNO3, 1 mL of 1M sodium acetate solution, and diluted to 100 mL with D.I. water. Dialysis experiments were performed using a 12,000–14,000 MW cut-off membrane. Standard techniques were employed. The polymer product was precipitated and isolated by adding a small amount of the product to a large volume of acetone. The resulting gel was isolated and dissolved in a small amount of methanol. Any insoluble solids were filtered off, and the methanol polymer solution added to a large volume of acetone. The precipitated polymer was collected, washed, and dried under a vacuum. The dye monomer was incorporated into the dye at 0.13 mole percent (based on DADMAC monomer, assuming a dye monomer purity of 90%), or 0.08% by weight of product. About 99% incorporation of the dye into the polymer was achieved. Total polymer solids of the tagged polyDADMAC was measured at 15%. The synthesized tagged polymer had the following characteristics setforth in Table I.

TABLE I

| | Tagged pDADMAC | pDADMAC |
|---|---|---|
| Appearance: | Deep Red/Pink Color | Clear White |
| Brookfield Viscosity: | 1363 cps | 990 cps |
| I. V.: | 1.0 dL/g | 1.03 dL/g |
| pH: | 4.85 | 4.68 |
| Wt. Average MW: | 890,000 | 475,000 |
| Number Average MW: | 70,000 | 32,000 |
| Polydispersity: | 12.7 | 14.8 |
| Polymer Solids: | 15% (theo.) | 14.97 |

Except for the color, tagged pDADMAC has similar characteristics to un-tagged pDADMAC. PolyDADMAC dye incorporation was determined analytically. The polymer remained colored after precipitation and washing. The polymer was also placed in a 12,000–14,000 dialysis membrane and dialyzed with D.I. water for 48 hours. Only a small amount of color was observer to pass out of the membrane. The material in the membrane was bright pink. A control experiment was done, in which, the dye monomer was blended with a sample of un-tagged pDADMAC. In this case practically all of the dye seemed to pass through the membrane leaving the un-tagged polymer behind. Analysis indicated that there were about 9 ppm of residual tagged monomer in the tagged polymer.

Detection Limits

Lower detection limits are desirable for several reasons. Lower detection limits allows formulators to use lower dye levels in new products. For control purposes, a dye-tagged molecule requires detection without changing product properties. Finally, for tagged polymer detection, the higher the dye molecule fluorescence sensitivity, the lower the detection limit. This last point is important for answering the question of polymer residuals in treated waters. Fluorescence sensitivity is defined as: Fluorescence Sensitivity= extinction coefficient x Quantum Yield From Table II it is shown the modified Rhodamine has a higher Fluorescence Sensitivity than Rhodamine B. By modifying Rhodamine B we get two distinct advantages over Rhodamine B: high fluorencence sensitivity and the ability to incorporate the dye into free-radical polymerization reactions. For tagged pDADMAC, the detection limit was determined to be 50 ppb using standard fluorometry techniques. It could be as low as 10 ppb.

TABLE II

|  | Absorption Peak (nm) | Extinction Coefficient (1-mol/cm) | Relative Quantum Yield* |
|---|---|---|---|
| Rhodamine B | 555 | 110,000 | 0.62 (absolute) |
| Modified Rhodamine B | 560 | 88,500 | 0.96 |
| Tagged polyDADMAC | 585 | 181 | 0.425 |

*Rhodamine B has an absolute Quantum yield of 0.62.

Stability

Since the Rhodamine B modified polymers is formed by free radical polymerization via chemical reaction of an acrylate onto the carboxphenyl moiety, the reverse hydrolysis reaction would remove the dye moiety. Consequently, the acrylate group's stability to hydrolysis is important. The modified Rhodamine B-acrylate monomer was subjected to potential hydrolysis conditions and using chromatography to determine the free Rhodamine B (residual and from hydrolysis), the monomer, and any other hydrolysis products. Results showed that at pH 7 and low monomer concentration (1–20 ppm), about 15–20% of the tagged monomer were hydrolyzed after 28 days at room temperature without exposure to light. However, high monomer concentration (800 ppm) solution appeared to be stable up to 4 weeks at room temperature without exposure to light. It is predicted that the dye monomer's hydrolysis rate will be slower when it is attached to a polymer, due to possible steric constraints.

Tagged Polymer Activity

Aeration Basin effluent wastewater from a refinery was used for activity testing. FIG. 3 shows that tagged polyDADMAC has activity. This result proves that chemically tagging pDADMAC does not inhibit coagulation power. Activity was measured in NTUs (Nephrolytic Turbidity Units).

We claim:

1. A method of treating industrial waters with fluorescent copolymers to control and monitor the dosage and presence of said copolymers which comprises the steps of:

a) adding a fluorescent copolymer to said industrial water, wherein said fluorescent copolymer is formed from the free radical polymerization of diallyldimethyl ammonium chloride with the Rhodamine B ester of a hydroxy $C_2$–$C_6$ lower alkyl acrylate: and, b) monitoring said fluorescent copolymer in said industrial water by fluorescence detection.

2. The method of claim 1 wherein said ester is of a linear hydroxy lower alkyl radical having said hydroxy group attached to the terminal carbon atom of said lower alkyl radical.

3. The method of claim 1 wherein said hydroxy lower alkyl radical is a $C_2$–$C_4$ alkyl radical.

4. The method of claim 1 wherein said fluorescent copolymer contains from 0.01–2 mole percent of said ester.

5. The method of claim 1 wherein said ester is the Rhodamine B ester of 4-hydroxy butyl acrylate.

* * * * *